June 22, 1943.        D. E. MONTGOMERY        2,322,304
AUTOMATIC VALVE
Filed July 10, 1942        2 Sheets-Sheet 1

Inventor
DAVID E. MONTGOMERY

By
Attorney

Inventor
DAVID E. MONTGOMERY

Patented June 22, 1943

2,322,304

UNITED STATES PATENT OFFICE 2,322,304

AUTOMATIC VALVE

David E. Montgomery, Mirando City, Tex.

Application July 10, 1942, Serial No. 450,438

6 Claims. (Cl. 137—68)

This invention relates to automatic valves and more particularly to a valve to be installed in a pipe line leading from a storage tank to a place or apparatus where oil or other liquid flowing through the pipe line is to be used, the present application constituting a continuation in part of my prior application filed February 5, 1941, and bearing Ser. No. 377,556.

It is one object of the invention to provide a valve which will very effectively prevent air from flowing in through the pipe line and from the storage tank when the tank is empty.

Another object of the invention is to provide an improved arrangement of valves wherein the main valve installed in the pipe line will be automatic in its operation and opening and closing of the valve controlled by pressure on the liquid flowing through the pipe line from the tank.

Another object of the invention is to provide a valve structure consisting of a main valve and a plurality of auxiliary valves so arranged that when liquid under pressure is flowing through the pipe line, a portion of the liquid will be by-passed to a cylinder and act on a piston to raise the same and open the main valve, the main valve being held open until the liquid is exhausted in the reservoir from which it flows and liquid in the by-pass then flowing from the same back into the pipe line so that the piston may move downwardly and the main valve close to prevent air flowing through the pipe line from the reservoir.

Another object of the invention is to provide an improved valve structure which may be easily installed and will not be liable to get out of order when in use.

Figure 1:
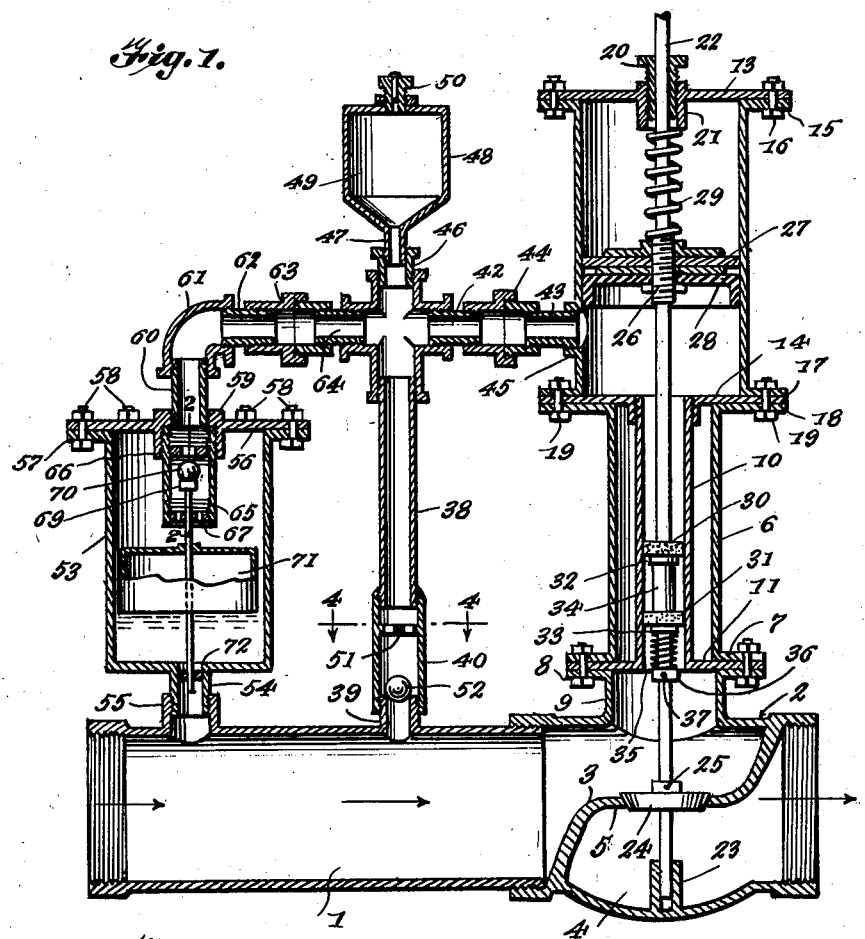
Fig. 1 is a sectional view taken vertically through the improved valve structure.
Figure 2:
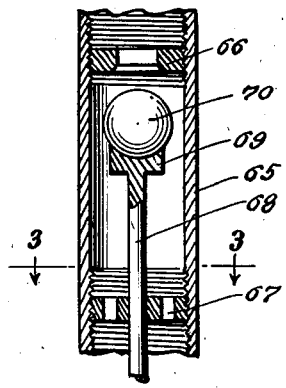
Fig. 2 is a sectional view on an enlarged scale on the line 2—2 of Fig. 1.
Figure 3:
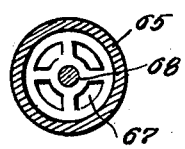
Fig. 3 is a transverse sectional view on the line 3—3 of Fig. 2.
Figure 4:
Fig. 4 is a sectional view on the line 4—4 of Fig. 1.
Figure 5:
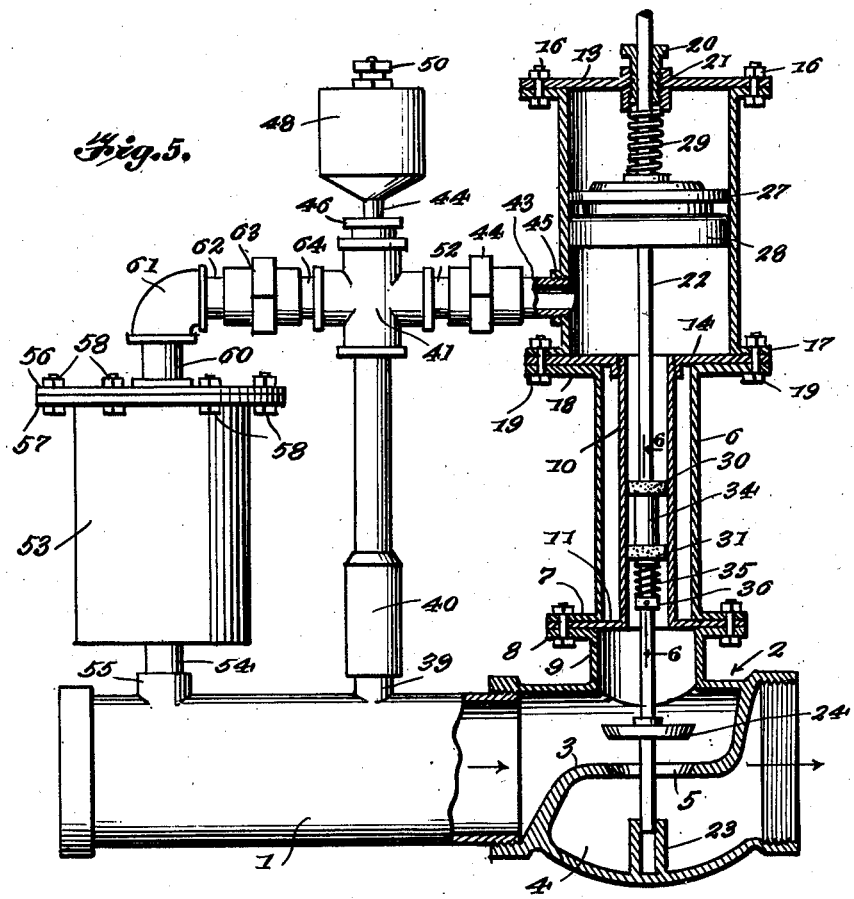
Fig. 5 is a view showing the improved valve structure partially in side elevation and partially in vertical section, the valve being open.
Figure 6:
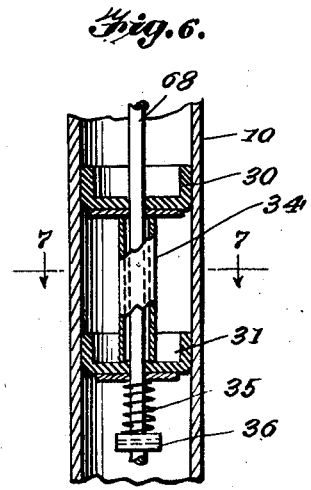
Fig. 6 is an enlarged sectional view on the line 6—6 of Fig. 5.
Figure 7:
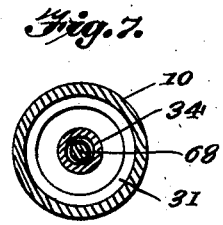
Fig. 7 is a sectional view taken transversely through Fig. 5, on the line 7—7.

The pipe section 1, when installed, constitutes a portion of a pipe line leading from a reservoir to a place or apparatus where oil or other liquid is to be used, and one end of this pipe section has threaded engagement with the inlet end of a valve 2 of the type wherein a partition 3 in the valve casing 4 is formed with a valve seat 5 surrounding an opening through which the liquid flows in order to reach the outlet end of the valve casing. A column 6 extends vertically over the valve 2 and has an outstanding flange 7 about its lower end which is bolted to a flange 8 surrounding the upper end of a neck 9 which projects upwardly from the valve casing 4 above the valve seat 5. A tube 10 which is of appreciably less diameter than the column 6, extends vertically therein, in spaced relation to walls of the column and, at its lower end, the tube is formed with an outstanding flange 11 which fits between the flanges 7 and 8 and is secured by the bolts previously referred to. It will thus be seen that the column and the tube will be firmly mounted over the valve casing in concentric relation to each other and in concentric relation to the valve seat 5.

Above the column, and supported thereby, is a vertically disposed cylinder 12 having upper and lower heads 13 and 14, the upper head being secured to the flange 15 of the cylinder by bolts 16 and the lower head having its marginal portions disposed between the flanges 17 and 18 of the cylinder and the column 6 and secured by bolts 19. By this arrangement, the cylinder will be firmly supported over the column but may be easily removed when repairs or cleaning become necessary. A packing gland 20 is mounted through a sleeve 21 at the center of the upper head and through this gland passes the upper portion of a valve stem 22 which extends vertically through the cylinder 12 and tube 10 with its lower portion passing through the opening in the partition 3 and slidably engaged in a guide 23 at the bottom of the valve casing 4. This stem 22 carries a valve disc 24 secured by a pin 25 in position to seat on the valve seat 5 and close the opening in the partition when in lowered or closed position. A portion 26 of the stem within the cylinder is threaded and carries a piston 27, the leather cup 28 of which has close contacting engagement with walls of the cylinder and, in order to urge the piston and valve stem downwardly, there has been provided a spring 29 which is coiled about the same and has a tendency to force the stem downwardly and hold the valve disc 24 in closed position on the valve seat 5. The stem also carries leather cups 30 and 31 which rest on washers 32 and 33 and are held in spaced relation to each other by a spacing sleeve 34. A spring 35 which is coiled about the stem, has its lower end resting on a collar 36, splined to the stem, as shown at 37, and the upper end of the spring abuts washer 33 so that the cups 30 and 31 will be urged upwardly and the cups held in sealing engagement with walls of the tube 10 when subjected to downward pressure of oil in the tube as the stem is shifted upwardly to open the main valve 24.

In order to deliver oil from the pipe section 1 to the cylinder 12, there has been provided a vertically extending pipe or elongated nipple 38 which has its lower end connected with the outlet neck 39 of pipe 1 by a check valve 40 and its upper end engaged with a four-way coupling 41, said coupling carrying a nipple 42 which is connected with a nipple 43 by a union 44. The nipple 43 is screwed into a port 45 formed in the cylinder 12 near the lower end thereof, and when oil under sufficient pressure enters the cylinder under the piston 27, it will force the piston upwardly and the stem will be raised to open valve 24 and hold it in raised or open position. It will be understood that the reservoir from which oil is delivered will be of such a height that oil flowing from it through it will be under sufficient pressure to raise the piston and open the valve. When flow of oil ceases, the pressure will be eliminated and spring 29 will shift the piston and the stem downwardly to close the valve and prevent air from flowing through the pipe line from the reservoir. At its upper end, the coupling 41 carries a bushing 46 into which is screwed the neck 47 of a drum 48 defining an air chamber 49 and carrying a check valve 50 for the upper end of the air chamber. The valve 40 has its tubular casing formed with an internal seat 51 in the form of a spider for engagement by the valve ball 52 so that upward movement of the valve ball may be limited by engagement of the valve ball with the spider without cutting off flow of oil upwardly through the tube 38.

A float box 53 having a neck at its lower end, is disposed over the pipe section 1, with its neck screwed into the neck 55 of the pipe section to support the box in vertical position. The head 56 for the upper end of the box is secured to the outstanding flange 57 thereof by bolts 58 and, at its center, is formed with a double socket 59 into the upper end of which is screwed a nipple 60. This nipple has its upper end screwed into an elbow 61 carrying a nipple 62 and a union 63 connects this nipple with a nipple 64 carried by the coupling 41. A valve 65 having a tubular casing, has its upper end screwed into the socket 59 so that it is mounted vertically in the upper portion of the valve casing and a spider 67 is threaded into the lower portion of the valve casing and serves as a guide for a stem 68 which is slidable vertically through the guide and, at its upper end, is provided with a head or cup 69 for holding a valve ball 70. The stem is mounted through a float 71 in the float box and its lower portion passes through a guide or spider 72 mounted in the upper portion of the neck 54. Therefore, as the float is raised or lowered, the stem will be shifted longitudinally in a vertical direction and the valve ball moved into or out of closed position against the valve seat 66.

When this improved valve mechanism is in use, it is mounted in a pipe line leading from a reservoir to a place at which oil or other liquid is to be used and the liquid enters the pipe section 1 and flows through the same in the direction indicated by the arrows. As the liquid flows through the pipe section 1, it enters the float box and shifts the float upwardly to close the valve therein and liquid also flows upwardly into the valve 40 to raise the ball 52 and open this valve and allow the liquid to pass upwardly through pipe 38 to the coupling 41, from which it flows through nipples 42 and 43 into the lower portion of the cylinder 12. The liquid entering the cylinder acts on the piston 28 to shift the piston and the valve stem 22 upwardly and the main valve 4 will be opened to allow liquid to flow through the pipe line to the place of use. When the reservoir is emptied, or its level is reduced to a predetermined point, pressure of the liquid will no longer hold the valve ball 52 in open position and it will drop on the seat at the upper end of the neck 39. The purpose of the device is to close the main valve 24 when the tank empties, thus preventing air from entering the pipe line. As pump suction line is downgrade to pump, if the line is allowed to empty after the tank empties, the next time a tank is to be run, the line will have air in it and it takes a lot of time to bleed the air out, or, in the case of gravity lines, the air in the line will not let it gravitate. The idea is to keep the line full of liquid at all times and that is what this valve does. I have had one in operation since last November and it is working perfectly. Since the seat 51 is a spider, it does not prevent a backward pressure from flowing through the valve as there is pressure on the intake side and suction on discharge side of the valve. Valve 52 admits fluid beneath the piston 27 to open the main valve 24. Valve 70 is to hold fluid under the piston until tank empties. When the liquid in the float box returns to the line, it releases the valve 70 and fluid under the piston 27 and closes the main valve 24. It should also be noted that as the liquid level is lowered, the float 71 will move downwardly with it and liquid in the cylinder may drain out through the nipples 64, 62 and 60 into the float box. When the main valve is closed, air will be prevented from flowing through the pipe line in a direction indicated by the arrows. It will thus be seen that flow of liquid under pressure through the pipe line will cause the main valve to be opened and held open and that as soon as the supply of liquid becomes exhausted the main valve will close and be held closed by action of the spring 29 which is of sufficient strength to prevent air pressure from opening main valve 24.

Having thus described the invention, what is claimed is:

1. A valve structure of the character described comprising a pipe section, a main valve having a casing secured at its inlet end to the outlet end of the pipe section, a column extending upwardly from the valve casing, a cylinder mounted vertically on the upper end of said column, a tube extending vertically in said column, a stem extending vertically through the tube and cylinder with its lower portion extending into the valve casing, a valve head carried by the lower portion of the stem for closing the main valve as the stem moves downwardly, a piston carried by the stem within said cylinder, means urging the piston and stem downwardly, sealing means for space within the tube about the stem carried by said stem and having close contacting engagement with walls of the tube, a float box disposed vertically over the pipe section and having a port at its bottom communicating with the pipe section, an auxiliary valve in the float box communicating with an opening at the top of the float box, a float in the float box, a stem for said float extending vertically with its upper portion entering a casing for the auxiliary valve and having a head at its upper end, an auxiliary valve ball resting on said head and closing against an auxiliary valve seat when the float and its stem are moved upwardly by liquid in the float box, a conduit leading from the opening at the top of the float box to the lower end of said cylinder, a neck extending upwardly from the pipe section intermediate the float box and main valve, a check valve casing extending upwardly from said neck and formed with an internal spider, a valve ball in the casing of the check valve and movable from closed position at rest on the neck to raised position against the spider, a bypass pipe extending vertically from the upper end of the check valve casing to said conduit, and an air chamber carried by the conduit over the bypass pipe.

2. A valve structure of the character described comprising a pipe section, a main valve including a casing having its inlet connected with the outlet end of the pipe section, a column mounted on the valve casing and extending upwardly therefrom, a cylinder mounted on the upper end of said column, a stem extending vertically through the cylinder and the column with its lower portion entering the valve casing, a valve member carried by said stem within the casing for closing the valve as the stem moves downwardly, means for sealing space about the stem within the column, a piston carried by said stem within the cylinder, a spring urging the stem and piston downwardly to close the valve, a float box having a port at its lower end communicating with said pipe section, a conduit leading from the upper end of said box to the lower end of said cylinder, a valve at the junction of the conduit with the float box, a float in said float box for actuating the valve and closing same as the float moves upwardly, a tube extending vertically between the pipe section and said conduit intermediate the float box and cylinder, and a check valve casing connecting said tube with said pipe section and having a lower valve seat and a valve ball movable vertically into and out of closing engagement with its valve seat.

3. A valve structure of the character described comprising a pipe section, a main valve including a casing having its inlet connected with the outlet end of the pipe section, a cylinder mounted vertically in an elevated position above the valve, a stem extending vertically through said cylinder and slidable vertically with its lower portion entering the valve casing, a valve head carried by the stem and moving to closed position as the stem slides downwardly, a piston carried by said stem within the cylinder, a float box above the pipe section having its lower end communicating with the pipe section, a conduit connecting the upper end of said box with the cylinder below the piston, a float in the float box, a valve for said conduit closed by upward movement of said float, and a pipe between the conduit and the pipe section controlled by a check valve having a ball valve shiftable vertically between a lower closed position and an upper open position by action of liquid under pressure in the pipe section.

4. A valve structure of the character described comprising a pipe section, a main valve having a casing secured at its inlet end to the outlet end of the pipe section, a closure member for the valve having a stem extending upwardly from the casing, pressure actuated means for shifting the stem upwardly and opening the closure member of said valve, a float box communicating with the pipe section, a float in the float box, a conduit between the float box and the pressure controlled means, a valve for the conduit having a closure member movable to closed position by upward movement of the float, and a pipe leading from the conduit and connected with the pipe section by a check valve having a closure member movable upwardly to open position in response to variations in pressure of liquid in the pipe section.

5. A valve structure of the character described comprising a pipe section, a main valve having a casing secured at its inlet end to the outlet end of the pipe section, pressure actuated means for opening and closing the main valve, a conduit leading from the pressure actuated means and having a branch connected with the pipe section, said branch including an upwardly opening check valve, a float box interposed between the conduit and the pipe section, a float in the float box, and a valve controlling communication between the conduit and the float box operatively associated with the float to cause closing of the valve as the float moves upwardly.

6. A valve structure of the character described comprising a pipe section, a main valve having a casing connected at its inlet end with the outlet end of the pipe section, pressure actuated means for opening and closing the main valve, a conduit leading from the pressure actuated means and having a branch connected with the pipe section and including a check valve adapted to be opened and closed in response to variations in pressure of liquid in the pipe section, another branch connecting the conduit with the pipe section, and a float-controlled valve in the last mentioned branch adapted to be closed by upward movement of the float.

DAVID E. MONTGOMERY.